US009118550B2

(12) United States Patent
Yang et al.

(10) Patent No.: US 9,118,550 B2
(45) Date of Patent: Aug. 25, 2015

(54) SYSTEMS AND METHODS FOR MANAGING APPLICATIONS

(71) Applicant: HTC CORPORATION, Taoyuan, Taoyuan County (TW)

(72) Inventors: Ju-Ting Yang, Taoyuan County (TW); Yin-Yeh Tseng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 94 days.

(21) Appl. No.: 14/165,263

(22) Filed: Jan. 27, 2014

(65) Prior Publication Data

US 2014/0143417 A1    May 22, 2014

Related U.S. Application Data

(62) Division of application No. 13/427,552, filed on Mar. 22, 2012, now abandoned.

(60) Provisional application No. 61/468,358, filed on Mar. 28, 2011, provisional application No. 61/496,578, filed on Jun. 14, 2011.

(51) Int. Cl.
  *G06F 7/04* (2006.01)
  *G06F 17/30* (2006.01)
  (Continued)

(52) U.S. Cl.
  CPC ...... *H04L 43/08* (2013.01); *G06F 8/61* (2013.01); *G06F 9/46* (2013.01); *G06F 21/55* (2013.01); *G06F 21/56* (2013.01); *G06Q 10/10* (2013.01); *H04L 12/58* (2013.01); *H04W 4/003* (2013.01)

(58) Field of Classification Search
  CPC .......... H04W 4/003; G06F 9/46; G06F 21/55; G06F 21/56; G06Q 10/10; H04L 12/58
  USPC .................. 455/410; 717/100, 106, 121, 140, 717/168–178; 705/908–909; 719/313, 318
  See application file for complete search history.

(56) References Cited

U.S. PATENT DOCUMENTS 8,255,991 B1 *   8/2012   Hackborn et al. .............. 726/21
8,589,140 B1 * 11/2013   Poulin ............................ 703/22
(Continued)

FOREIGN PATENT DOCUMENTS

| CN | 101005675 A | 7/2007 |
|----|-------------|--------|
| CN | 101561859 A | 10/2009 |
| TW | 578433 B | 3/2004 |

OTHER PUBLICATIONS

Open Mobile Alliance, "Add Application State transtion Notify over TAS6", Open Mobile Alliance Ltd., pp. 1-3, 2011.
(Continued)

*Primary Examiner* — Jeffrey Pwu
*Assistant Examiner* — Jayesh Jhaveri
(74) *Attorney, Agent, or Firm* — Birch, Stewart, Kolasch & Birch, LLP

(57) ABSTRACT

A method for notifying a first device of a status of an application includes transmitting an application state transition notification message from a second device to the first device when a state transition of the application has occurred, wherein the application state transition notification message comprises information regarding at least a current state of the application and a reason of the state transition; and transmitting an application state transition response message from the first device to the second device in response to the application state transition notification message.

10 Claims, 8 Drawing Sheets

(51) Int. Cl.
*H04N 7/16* (2011.01)
*H04L 12/26* (2006.01)
*G06F 9/445* (2006.01)
*H04W 4/00* (2009.01)
*G06F 21/56* (2013.01)
*G06Q 10/10* (2012.01)
*G06F 9/46* (2006.01)
*G06F 21/55* (2013.01)
*H04L 12/58* (2006.01)

(56) References Cited

U.S. PATENT DOCUMENTS

| | | | |
|---|---|---|---|
| 8,719,776 B2 * | 5/2014 | Eteminan et al. | 717/113 |
| 2007/0113096 A1 | 5/2007 | Zhu et al. | |
| 2007/0202922 A1 * | 8/2007 | Myllynen et al. | 455/566 |
| 2009/0112735 A1 | 4/2009 | Viehmann et al. | |
| 2009/0119678 A1 * | 5/2009 | Shih et al. | 719/313 |
| 2009/0300578 A1 * | 12/2009 | Neil | 717/104 |
| 2010/0262959 A1 * | 10/2010 | Bruno et al. | 717/171 |
| 2011/0143663 A1 * | 6/2011 | Renard et al. | 455/41.1 |
| 2012/0151446 A1 * | 6/2012 | Sathya et al. | 717/125 |
| 2013/0031600 A1 * | 1/2013 | Luna et al. | 726/1 |

OTHER PUBLICATIONS

Open Mobile Alliance, "Application State transition Notification over TAS1", Open Mobile Alliance Ltd., pp. 1-3, 2011.

Open Mobile Mobile Alliance, "Application Status Check over TAS-5", Open Mobile Alliance Ltd., pp. 1-3, 2011.

* cited by examiner

SYSTEMS AND METHODS FOR MANAGING APPLICATIONS

CROSS REFERENCE TO RELATED APPLICATIONS

This application is a Divisional of co-pending application Ser. No. 13/427,552, filed on Mar. 22, 2012, the entire contents of which are hereby incorporated by reference and for which priority is claimed under 35 U.S.C. §120. This application also claims the benefit of U.S. Provisional Application No. 61/468,358 filed Mar. 28, 2011 and U.S. Provisional Application No. 61/496,578 filed Jun. 14, 2011, the entire contents of which are hereby incorporated by reference.

BACKGROUND OF THE INVENTION

1. Field of the Invention

The invention relates to systems and methods for managing applications.

2. Description of the Related Art

The Open Mobile Alliance (OMA) was formed in June 2002 by nearly 200 companies representing the world's leading corporations in various fields of the mobile industry, including mobile operators, device and network suppliers, information technology companies, and content/service providers, with the aim to develop open standards for providing interoperable service enablers which work in different countries and with different operators and mobile devices.

The OMA standardises applicative protocols. OMA specifications are meant to work with any cellular network technologies being used to provide networking and data transport. These networking technology are specified by outside parties. The cellular network technologies that can work with OMA include Global System for Mobile Communications (GSM), Enhanced Data rates for GSM Evolution (EDGE), General Packet Radio Service (GPRS), Universal Mobile Telecommunications System (UMTS), Long Term Evolution (LTE), LTE advanced, and so on. In addition, the mobile services can be applicable in the mobile devices regardless of the types of operating systems being used, which can be Windows, Android or Linux. Therefore, the mobile industry greatly benefits from the interoperable services developed under OMA.

BRIEF SUMMARY OF THE INVENTION

Systems and methods for managing applications are provided. An exemplary embodiment of a system for managing a plurality of applications comprises a first device, a second device, a first interface and a second interface. The first device is responsible for exhibiting and providing applications to one or more user(s). The second device is responsible for managing applications which are uploaded by one or more developer(s) who have developed the applications. The first interface is provided for the second device to submit the applications to the first device. The second interface is provided for the first device to transmit at least a report message to the second device.

An exemplary embodiment of a method for managing a plurality of applications comprises: transmitting the applications to a first device via a first interface by a second device, wherein the first device is responsible for exhibiting and providing the applications to one or more user(s) and the second device is responsible for managing the applications which are uploaded by one or more developer(s) who have developed the applications; and transmitting a report message to the second device via a second interface by the first device, wherein the report message comprises information regarding the applications and wherein the second interface defines a format of one or more message(s) to be transmitted from the first device to the second device.

Another exemplary embodiment of a method for managing a plurality of applications comprises: providing a first interface between a first device and a second device, wherein the first device is responsible for exhibiting and providing the applications received from the second device to one or more user(s) and the second device is responsible for managing the applications which are uploaded by one or more developer(s) who have developed the applications; and transmitting a report message from the first device to the second device via the first interface, wherein the report message comprises information regarding the applications.

Another exemplary embodiment of a method for notifying a first device of a status of an application comprises transmitting an application state transition notification message from a second device to the first device when a state transition of the application has occurred, wherein the application state transition notification message comprises information regarding at least a current state of the application and a reason of the state transition; and transmitting an application state transition response message from the first device to the second device in response to the application state transition notification message.

Another exemplary embodiment of a method for notifying a first device of a status of an application comprises: transmitting an application status check request message from the first device to a second device; and transmitting an application status check response message from the second device to the first device in response to the application status check request message, wherein the application status check response message comprises information regarding at least a current state of the application.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

Table 1 shows exemplary content of the application state transition notification message 801.

Table 2 shows exemplary structure of the StateTransAppList.

Table 3 shows exemplary enumeration of the StateTransTypeDeveloper.

Table 4 shows exemplary content of the application state transition notification message 901.

Table 5 shows exemplary structure of the StatetransAppList.

Table 6 shows exemplary enumeration of the State.

Table 7 shows exemplary content of the application status check request message 1101.

Table 8 shows exemplary content of the application status check response message 1102.

Table 9 shows exemplary enumeration of the AppStatus.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the Open Mobile Alliance (OMA), a TAS (Telco's Application Store) working group establishes a unified framework of application stores which integrates all the stages of an application's developmental support, distribution, sales and so on in a system for managing the applications, and provides a variety of specific mobile applications and carefully selected for users. In a first aspect of the invention, the framework, including the components and interfaces, of Telco's Application Store system will be illustrated. In a second aspect of the invention, the application state transition notification message transmitted over the interfaces will be illustrated.

Figure 1:
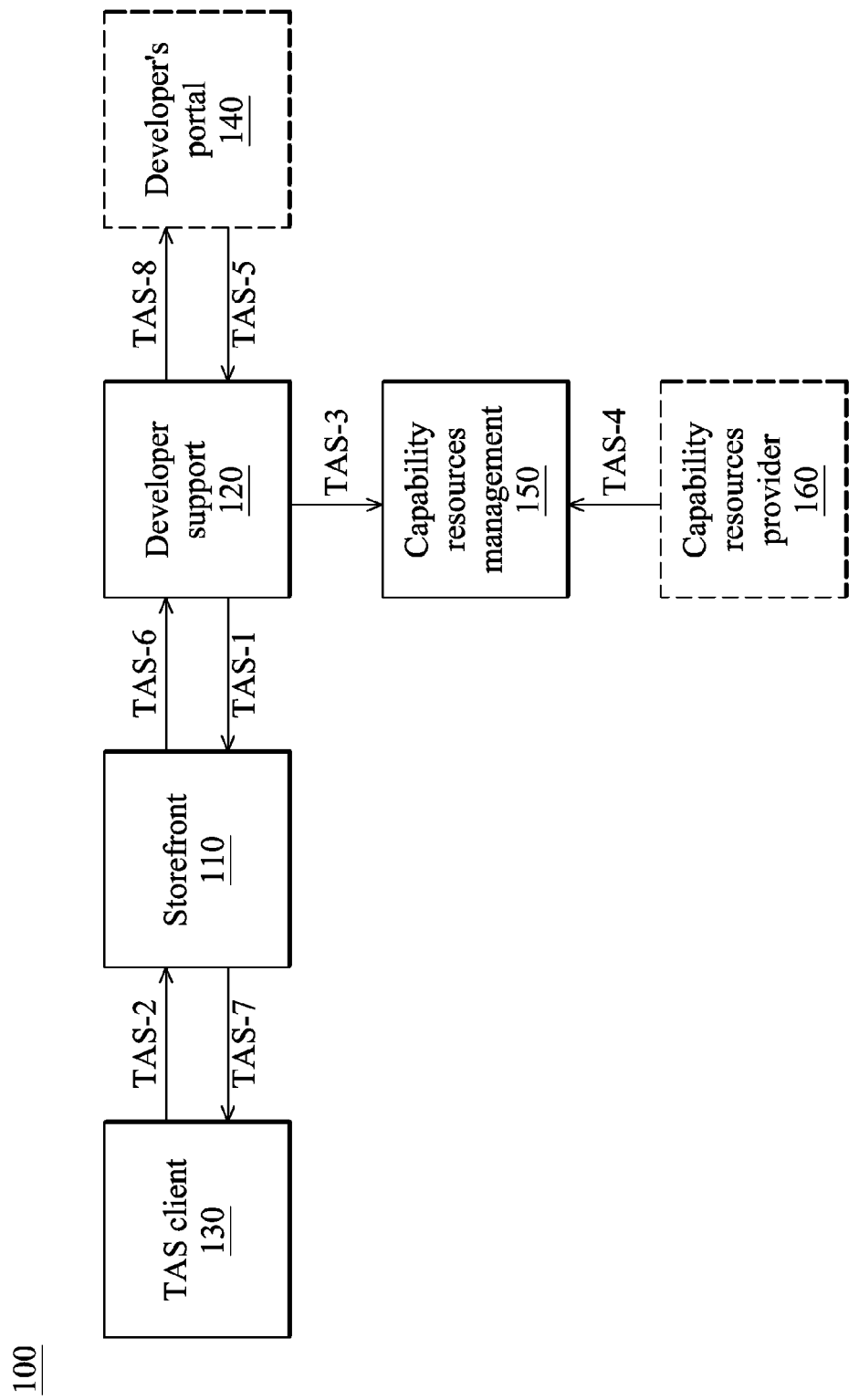
FIG. 1 shows a framework of a system for managing applications according to an embodiment of the invention

FIG. 1 shows a framework of a system for managing applications according to an embodiment of the invention. The system 100 may be a Telco's Application Store system and may comprise a plurality of internal functional components, such as a storefront component 110, a developer support component 120, a TAS client component 130 and a capability resources management component 150, and a plurality of external functional components, such as a developer's portal component 140 and a capability resources provider component 160. Besides the internal and external functional components, the system 100 may further comprise some interfaces, such as the interfaces TAS-1 to TAS-8, provided between the functional components. Each interface defines the format(s) of message(s) that can be transmitted from one functional component to another (as the direction pointed by the arrows as shown in FIG. 1).

In the embodiments, the functional components (either internal or external) as shown in FIG. 1 may be implemented by a combination of software modules and hardware devices. For example, the functionalities to be carried out by the functional components as shown in FIG. 1, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer or a processor, the machine thereby becomes an apparatus or a device for practicing the functionalities. In other words, in the embodiments, the functional components as shown in FIG. 1 implemented by a combination of software modules and hardware devices may be regarded as tangible devices. The functional components and interfaces as shown in FIG. 1 will be introduced in the following paragraphs.

The storefront component 110 is responsible for exhibiting and providing applications to users. For example, the storefront component 110 may comprise an application library for collecting the applications. Users download the applications by using the TAS Client component 130, which is embedded in their handsets or installed in the personal computer, or by accessing a web portal. The storefront component 110 is also responsible for user management (such as user's personalization data, user's purchase records, user's application favorites and shopping carts, etc.). For example, the storefront component 110 may further comprise a database for storing user information. Users can manage their personal information by the TAS Client component 130 or web portal. In addition, the storefront component 110 is also responsible for providing IAP (In Application Purchase) items to the application. The storefront component 110 accepts the IAP purchase request from application directly or indirectly (passed via TAS Client component 130), then charges the user (need user confirmation) according to the information of the requested IAP items. Upon being successfully charged, the storefront component 110 responds the purchase result to the application. In addition, the storefront component 110 is also responsible for application management (such as application category management, application sorting, application recommendation, etc.). The applications should pass the audit process in the developer support component 120 before they are submitted to the storefront component 110 via the TAS-1 interface. In addition, the storefront component 110 may also provide a user with applications that are compatible with the user's device capability.

The developer support component 120 is responsible for developer management (such as developer state management, contract process, settlement process, etc) and management of applications which are uploaded by developers. The developer support component 120 audits the uploaded applications and their related information and then makes them available to the storefront component via the TAS-1 interface. The applications may include features which need to invoke register resources. In this case, the information of the resources (e.g. how to invoke the resources) can be obtained via the TAS-4 interface. The developer support component 120 is also responsible for accepting IAP items configured to applications and their information.

The interface TAS-1 is exposed by the storefront component 110 (as the direction pointed by the arrows as shown in FIG. 1) and provided between the storefront component 110 and the developer support component 120 for the developer support component 120 to submit the applications to the storefront component 110. Note that the applications should pass the audit process in the developer support component 120 before they are submitted to the storefront component 110 via the TAS-1 interface. The interface TAS-1 may also be used to change the application's information in the storefront component 110 according to the operation in the developer support component 120. For example, if the developer support component 120 deletes one of the applications which are online, the delete operation should be sent to the storefront component 110 through the TAS-1 interface.

The TAS client component 130 is responsible for browsing and downloading applications from the storefront component 110, and interacting with the storefront component 110 to maintain the installation status of downloaded applications. The TAS client component 130 may deliver the device capability information to the storefront component 110 (e.g. when it requests to browse applications), by using the existed transport protocols, e.g.: HTTP User Agent Profile.

The interface TAS-2 is exposed by the storefront component 110 and provided between the storefront component 110 and the TAS client component 130 for the TAS client component 130 to submit download requests of applications. The interface TAS-2 may also be used to activate users, manage the user information, request information of applications, request purchase and return purchase results to a user, report the download/install/uninstall operation of an application, log-in/log-out from the storefront component 110, submit feedback of an application that user has downloaded, and others. Both the TAS client component 130 and the web portal interact with the storefront component 110 via the TAS-2 interface.

The capability resources management component 150 is responsible for managing information of capability resources. The capability resources may include an operator's network resources and internet resources. The resources can be registered to the capability resources management component 150 with its information. The capability resources management component 150 may also provide information of registered resources to other entities (not shown) via the TAS-4 interface.

The TAS-3 interface is exposed by the capability resources management component 150 and provided between the developer support component 120 and the capability resources management component 150 for the developer support component 120 to obtain information of registered capability resources. The TAS-3 interface may also be used to inform the developer support component 120 about the operations of a capability resource.

The capability resources provider component 160 may provide capability resources to the TAS Enabler. The capability resources may be, for example, a space for storing the applications. The capability resources provider component 160 registers capability resources and updates the information of those capability resources by the TAS-4 interface.

The interface TAS-4 is exposed by the capability resources management component 150 and provided between the capability resources management component 150 and the capability resources provider component 160 for the capability resources provider component 160 to register capability resources and update their information.

The developer's portal component 140 acts as a portal for developers. Developers upload application to the TAS Enabler using this component. The developer's portal component 140 may interact with the developer support component 120 by using the TAS-5 interface, to manage applications and IAP items, as well as to check the audit status of them.

The TAS-5 interface is exposed by the developer support component 120 and provided between the developer support component 120 and the developer's portal component 140 for the developer's portal component 140 to manage an application and IAP item. The TAS-5 interface may also be used to check the audit status of an application or IAP item.

According to an embodiment of the invention, besides the interfaces TAS-1 to TAS-5, an interface TAS-6 is further provided between the storefront component 110 and developer support component 120 and exposed by the developer support component 120. The interface TAS-6 may be provided for the storefront component 110 to transmit at least a report message to the developer support component 120. According to an embodiment of the invention, the report message comprises a sale report of the applications. For example, a number of times that an application has been browsed, a number of times that an application has been downloaded, and so on. According to another embodiment of the invention, the report message may comprise a malicious report of the applications for reporting which application(s) is/are malicious application(s) and has/have to be removed or deleted from the storefront component 110. For example, when an application has a malicious virus installed therein, the application may be reported as a malicious application and may be removed or deleted from the storefront component 110.

According to another embodiment of the invention, besides the interface TAS-6, an interface TAS-7 is further provided between the storefront component 110 and TAS client component 130 and exposed by the TAS client component 130. The interface TAS-7 may be provided for the storefront component 110 to transmit at least an update notification message to the TAS client component 130. The update notification message comprises update information of the applications. For example, the storefront component 110 may transmit an update notification message to notify the TAS client component 130 that an application has been updated in content, removed or deleted. The interface TAS-7 may also be provided for the storefront component 110 to transmit at least an advertisement notification message to the TAS client component 130 to notify advertisement information to the TAS client component 130 as well.

According to yet another embodiment of the invention, besides the interfaces TAS-6 and TAS-7, an interface TAS-8 is further provided between the developer support component 120 and the developer's portal component 140 and exposed by the developer's portal component 140. The interface TAS-8 may be provided for the developer support component 120 to transmit at least a punishment notification message to the developer's portal component 140, so as to carry out a blacklist control and perform a punishment policy. For example, when an application is determined as a malicious application, the developer support component 120 may transmit a punishment notification message to the developer's portal component 140 to notify a developer who has uploaded the application, and may add the developer in a blacklist. The punishment for the developer in a blacklist may be that, for example, the developer is forbidden to upload any applications for a period of time, or others.

Figure 2:
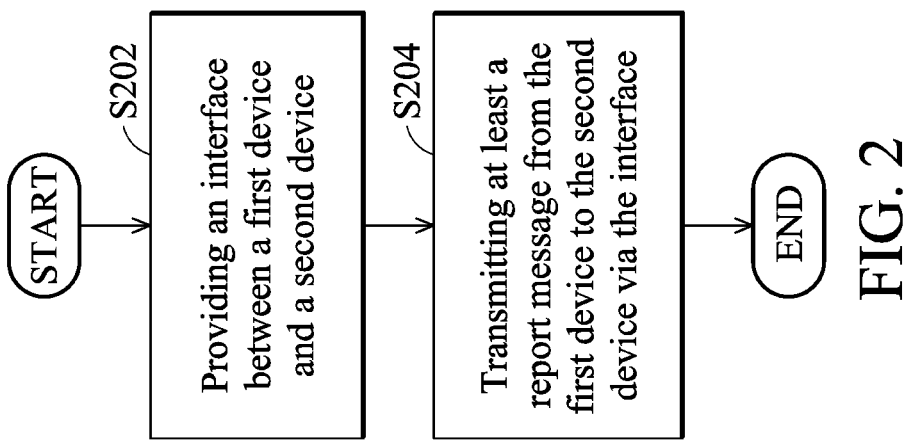
FIG. 2 shows a flow chart of a method for managing a plurality of applications according to an embodiment of the invention.

FIG. 2 shows a flow chart of a method for managing a plurality of applications according to an embodiment of the invention. First of all, an interface (e.g., the interface TAS-6) is provided between a first device (e.g. the storefront component 110) and a second device (e.g. the developer support component 120) (Step S202). The first device is responsible for exhibiting and providing the applications received from the second device to one or more user(s) and the second device is responsible for managing the applications which are uploaded by one or more developer(s) who have developed the applications. Next, at least a report message is transmitted from the first device to the second device via the interface (Step S204). The report message comprises information regarding the applications.

Figure 3:
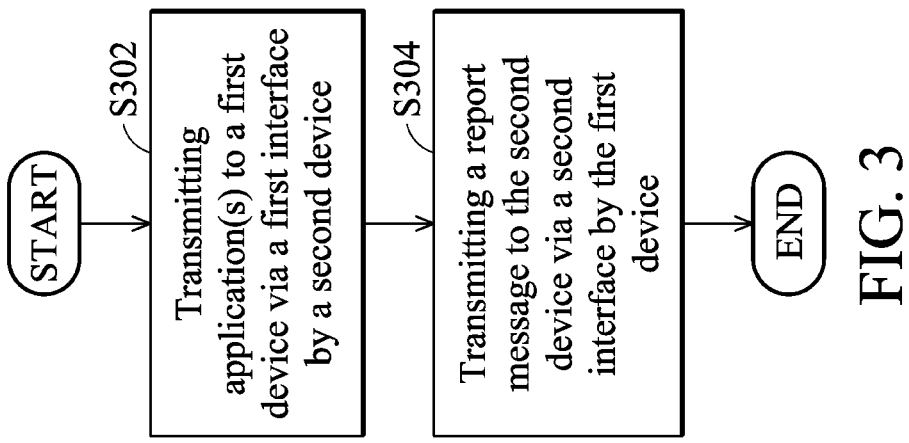
FIG. 3 shows a flow chart of a method for managing a plurality of applications according to another embodiment of the invention.

FIG. 3 shows a flow chart of a method for managing a plurality of applications according to another embodiment of the invention. First of all, the application(s) is/are transmitted to a first device (e.g. the storefront component 110) via a first interface (e.g., the interface TAS-1) by a second device (e.g. the developer support component 120) (Step S302). The first device is responsible for exhibiting and providing the applications to one or more user(s) and the second device is responsible for managing the applications which are uploaded by one or more developer(s) who have developed the applications. Next, a report message is transmitted to the second device via a second interface (e.g., the interface TAS-6) by the first device (Step S304).

Figure 4:
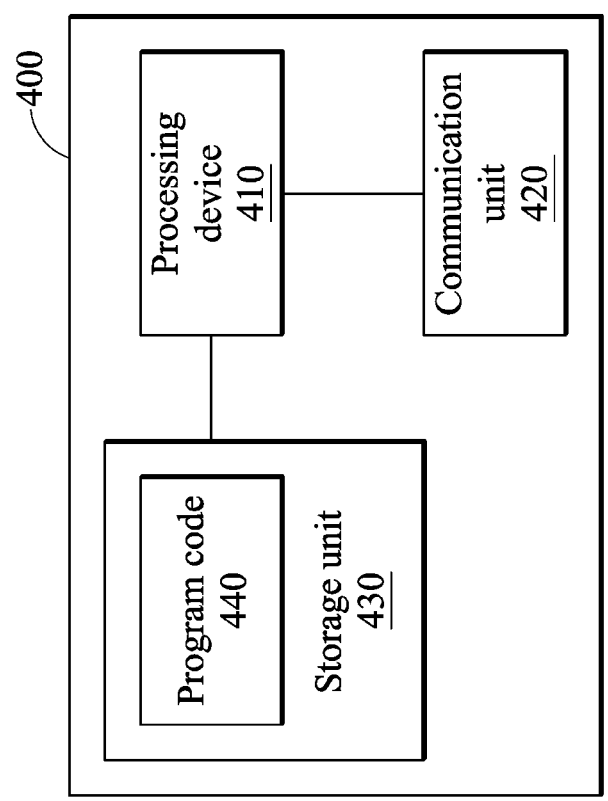
FIG. 4 is a simplified block diagram of a communication apparatus according to an embodiment of the invention.

FIG. 4 is a simplified block diagram of a communication apparatus according to an embodiment of the invention. The communication apparatus 400 may be one of the TAS components, such as the storefront component 110, the developer support component 120, the TAS client component 130, the capability resources management component 150 or others, as shown in FIG. 1. The communication apparatus 400 may comprise at least a processing device 410, a communication unit 420 and a storage unit 430. The processing device 410 may be a micro processor or an application specific integrated circuit (ASIC). The storage unit 430 may be any type of tangible storage media, for example but not limited to, a subscriber identity module (SIM), a read only memory (ROM), a random access memory (RAM), or others, for storing at least data and program code 440. The processing device 410 may execute the program code 440 by accessing storage unit 430. The communication unit 420 may comprise a transceiver for transmitting and receiving data in response to the commands or the controls from the processing device 410.

The application management methods as previously described, or certain aspects or portions thereof, may take the form of a program code (i.e., executable instructions) embodied in tangible storage media, such as floppy diskettes, CD-ROMS, hard drives, or any other machine-readable storage medium, wherein, when the program code is loaded into and executed by a machine, such as a computer or a processor, the machine thereby becomes an apparatus or device for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer or a processor, the machine becomes an apparatus or device for practicing the disclosed methods. When implemented on a general-purpose processor, the program code combines with the processor to provide a unique apparatus that operates analogously to application specific logic circuits.

According to the second aspect of the invention, the application state transition notification message transmitted over the TAS interfaces as illustrated above will be illustrated in the following paragraphs. In OMA TAS, the TAS enabler is able to manage different states of applications. For example, the developer support component 120 is able to maintain the applications and manage at least six states of applications, including but not limited to: "Submitted", "Audited", "Tested", "Online", "Offline" and "End". For another example, the storefront component 110 is able to maintain the applications and manage at least three states of applications, including but not limited to: "offline", "online" and "invalidated".

Figure 5:
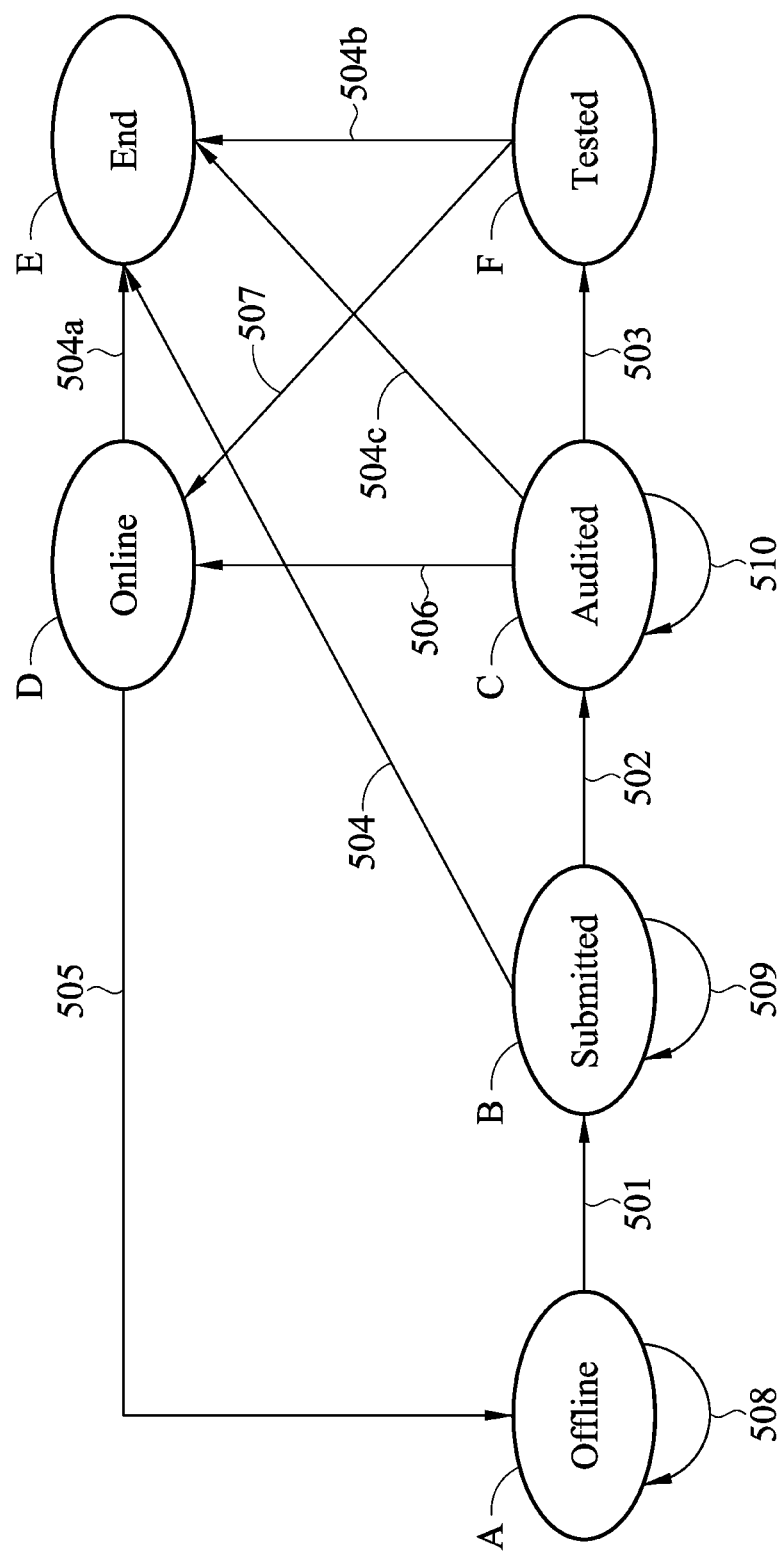
FIG. 5 is a state flow control diagram showing the transitions of application states according to an embodiment of the invention.

FIG. 5 is a state flow control diagram showing the transitions of application states managed by the developer support component 120 according to an embodiment of the invention. In FIG. 5, the states of application may comprise "Offline" (A), "Submitted" (B), "Audited" (C), "Online" (D), "End" (E) and "Tested" (F). Details of the state transitions will be further illustrated in the following paragraphs. When a developer has successfully logged in and registered to a TAS server or TAS service provider, the developer is permitted to upload the application and to access to the resources. In TAS system, a TAS server or TAS service provider may refer to the storefront component 110, the developer support component 120 and the capability resources management component 150. In addition, when the developer has uploaded the application, the application state may transit from "Offline" (A) state to "Submitted" (B) state (shown as the state transition 501). Note that when the registration or application upload is failed, the application state may be kept in "Offline" (A) (shown as the state transition 508).

After the developer has successfully uploaded the application, the application has to pass TAS service provider's audit procedure, and then the application state may transit from "Submitted" (B) state to "Audited" (C) state (shown as the state transition 502). When to trigger the audition process and what data is required in the audition process should depend on TAS server or TAS service provider's policies. If the application audit is failed, the application state may be kept in "Submitted" (B) (shown as the state transition 509). If the application has passed the audit, the application state may transit from "Audited" (C) state to "Online" (D) state (shown as the state transition 506), and the application can be published on the storefront component 110 for TAS client to download or purchase. Note that only the applications in the "Online" (D) state can be downloaded. When the uploaded applications are deleted or have been through the application revocation, the application state may transit from "Online" state (D) to "End" (E) state (shown as the state transition 504a). In addition, when the developer has de-register from the TAS server or TAS service provider, the application state may transit from "Online" (D) state to "Offline" (A) state (shown as the state transition 505).

Note that in the "Submitted" (B) state, if the developer try to delete the application or make the application revocation before the application is "Online" (D), the application state may transit from "Submitted" (B) state to "End" (E) state (shown as the state transition 504). In addition, in the "Audited" (C) state, the developer may request internal testing of the submitted application. If the application has passed the test, the application state may transit to "Tested" (F) state (shown as the state transition 503). If the application test is failed, the application state may be kept in "Audited" (C) state (shown as the state transition 510). Note that the test process is not a mandatory step. When the application is successfully audited and tested, the application state may transit from "Tested" (F) state to "Online" (D) state (shown as the state transition 507), and the application can be published on the storefront component 110 for TAS client to download or purchase. In the "Tested" (F) state, if the developer try to delete the application or make the application revocation before the application is "Online" (D), the application state may transit from "Tested" (F) state to "End" (E) state (shown as the state transition 504b).

Figure 6:
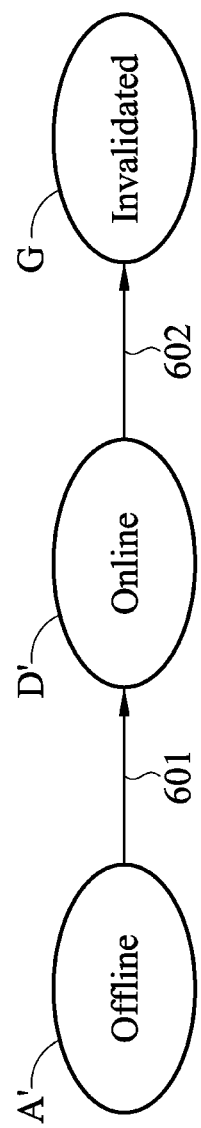
FIG. 6 is another state flow control diagram showing the transitions of application states according to another embodiment of the invention.

FIG. 6 is another state flow control diagram showing the transitions of application states managed by the storefront component 110 according to another embodiment of the invention. In FIG. 6, the states of application may comprise "Offline" (A'), "Online" (D') and "Invalidated" (G). The storefront component 110 needs to keep the application state list of each application respectively. Details of the state transitions will be further illustrated in the following paragraphs. When the application uploaded by developer is successfully verified, and the storefront component 110 is ready to publish the application on market, the application state may transit from "Offline" (A') state to "Online" (D') state (shown as the state transition 601) for TAS client to download or purchase. On the other hand, when the application is not allowed to be public on the storefront, such as the application is expired or withdrawn by the storefront component 110, the application state may transit from "Online" (D') state to "Invalidated" (G') state (shown as the state transition 602).

Figure 7:
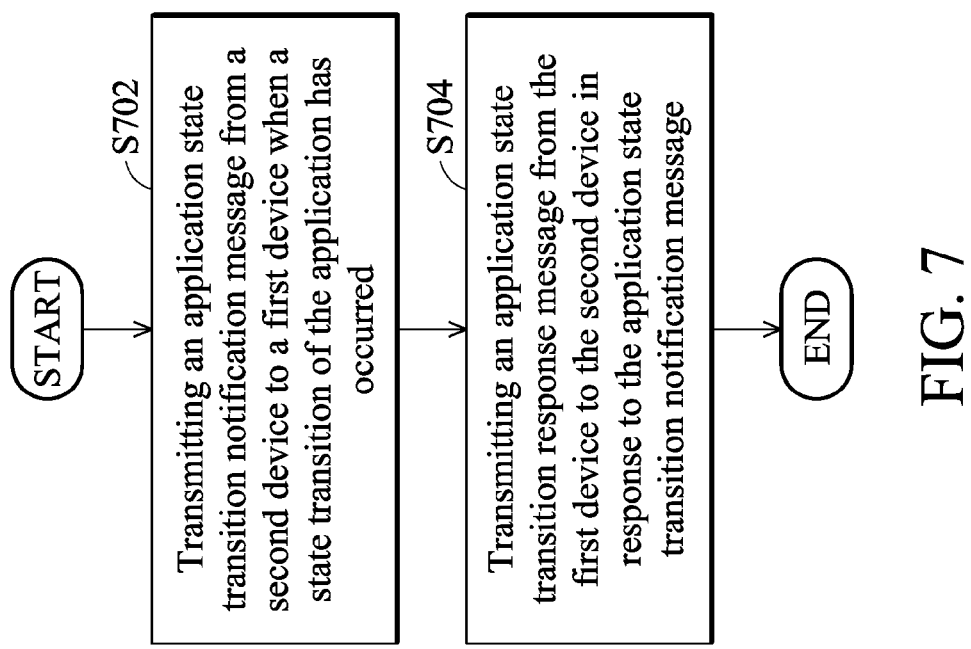
FIG. 7 is a flow chart of a method for notifying a first device of a status of an application according to an embodiment of the invention.

In order to manage the applications more efficiently, proper notification of the status of an application is required. FIG. 7 is a flow chart of a method for notifying a first device of a status of an application according to an embodiment of the invention. To begin, an application state transition notification message is transmitted from a second device to a first device when a state transition of the application has occurred (Step S702). According to an embodiment of the invention, the application state transition notification message may comprise information regarding at least a current state of the application and a reason of the state transition. According to another embodiment of the invention, the application state transition notification message may further comprise information regarding a previous state of the application. Next, an application state transition response message is transmitted from the first device to the second device in response to the application state transition notification message (Step S704).

Figure 8:
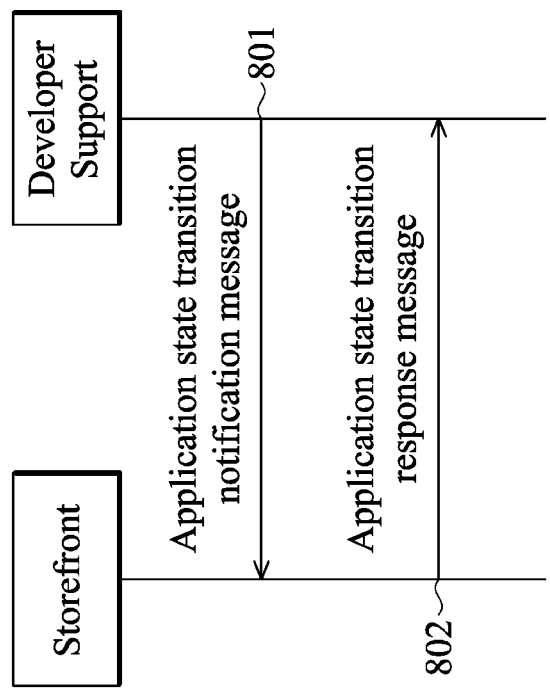
FIG. 8 shows a message flow chart according to a first embodiment of the invention.

According to a first embodiment of the invention, the first device may be a storefront component 110 in a Telco's Application Store (TAS) system, the second device may be a developer support component 120 in the TAS system, and the application state transition notification message may be transmitted via the TAS-1 interface. Note that in the first embodiment, the status of the application is maintained (such as the state flow control diagram shown in FIG. 5) by the developer support component 120. FIG. 8 shows a message flow chart according to a first embodiment of the invention. As shown in FIG. 8, the developer support may transmit an application state transition notification message 801 to the storefront. In response to the reception of the application state transition notification message 801, the storefront may further transmit an application state transition response message 802 to the developer support.

Table 1 shows exemplary content of the application state transition notification message 801.

TABLE 1

Application State Transition Notification message 801

| Name | Cardinality | Data Type | Description |
| --- | --- | --- | --- |
| DeveloperID | 1 | String | The ID of the Developer Support |
| SatteTransAppCount | 1 | Integer | Number of Application on the Developer Support which encounter state transition in this list |
| StateTransAppList | 0 - - - N | Structure | List of application ID(s) to be notified. |

Table 2 shows exemplary structure of the StateTransAppList.

TABLE 2

StateTransAppList structure

| Name | Cardinality | Data Type | Description |
| --- | --- | --- | --- |
| AppID | 1 | String | The ID of the application which encounters state transition |

TABLE 2-continued

StateTransAppList structure

| Name | Cardinality | Data Type | Description |
| --- | --- | --- | --- |
| StateTransTypeDeveloper | 1 | Integer | The description of the application state transition on Developer Support Component |
| statetransReason | 0 . . . 1 | String | Reason of the state transition |

Table 3 shows exemplary enumeration of the StateTransTypeDeveloper.

TABLE 3

StatetranstypeDeveloper Enumeration

| Enumeration | Description |
| --- | --- |
| 0 | OnlineEnd: The state transition is from "Online" state to "End" state |
| 1 | OnlineOffline: The state transition is from "Online" state to "Offline" state |

As shown in Table 1, the application state transition notification message 801 may comprise an identity field (DeveloperID) for indicating an identity of the developer support, an application count filed (StateTransAppCount) for indicating a number of application which has encountered the state transition in an application list (StateTransAppList), and the application list field (StateTransAppList). In addition, as shown in Table 2, the application list (StateTransAppList) lists the identity(ies) of application(s) (AppID) to be notified, description(s) of the state transition(s) (StateTransTypeDeveloper) and reason(s) of the state transition(s) (statetransReason). According to a preferred embodiment of the invention, as shown in Table 3, the application state transition notification message 801 is transmitted when the current state of the application has transited from the "Online" state to the "Offline" state (shown as the state transition 505 in FIG. 5) or when the current state of the application has transited from the "Online" state to the "End" state (shown as the state transition 504*a* in FIG. 5). As illustrated above, in the "Online" state, the application is able to be downloaded or purchased by a client while in the "Offline" state, the application is unable to be downloaded or purchased by a client. In addition, in the "End" state, application is deleted or revoked. Therefore, in the preferred embodiment, description of the state transition (StateTransTypeDeveloper) may be designed as an integer to represent whether the current state of the application has transited from the "Online" state to the "Offline" (e.g. '1') or from "Online" state to the "End" state (e.g. '0').

Note that in other embodiments of the invention, the application state transition notification message 801 may also be transmitted when any state transition has occurred. For example, the application state transition notification message 801 may be transmitted whenever there is a state transition from one of the "Submitted" state, the "Audited" state, the "Tested" state, the "Online" state, the "Offline" state and the "End" state to another. In still other embodiments of the invention, the application state transition notification message 801 may be periodically or proactively transmitted. For example, the period may be set by the developer support or the storefront. For another example, when the storefront would like to know the current state, the storefront may request the developer support to transmit the application state transition notification message 801. In still other embodiments of the invention, transmission of the application state transition notification message 801 may be triggered by some predefined events. The events may be predefined by TAS server or TAS services provider based on its policies. In addition, the application state transition response message 802 may comprise a result field for indicating the status code and error information.

Figure 9:
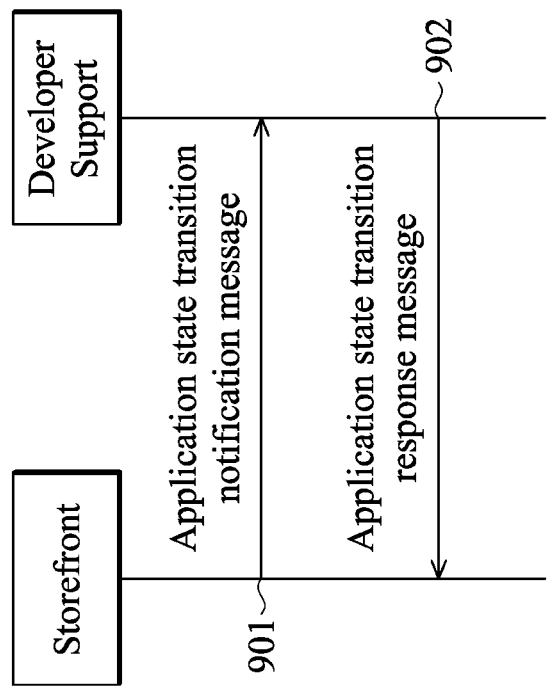
FIG. 9 shows a message flow chart according to a second embodiment of the invention.

According to a second embodiment of the invention, the first device may be a developer support component 120 in a Telco's Application Store (TAS) system, the second device may be a storefront component 110 in the TAS system, and the application state transition notification message may be transmitted via the TAS-6 interface. Note that in the second embodiment, the status of the application is maintained (such as the state flow control diagram shown in FIG. 6) by the storefront component 110. FIG. 9 shows a message flow chart according to a second embodiment of the invention. As shown in FIG. 9, the storefront may transmit an application state transition notification message 901 to the developer support. In response to the reception of the application state transition notification message 901, the developer support may further transmit an application state transition response message 902 to the storefront.

Table 4 shows exemplary content of the application state transition notification message 901.

TABLE 4

Application state transition Notification message 901

| Name | Cardinality | Data Type | Description |
| --- | --- | --- | --- |
| StoreID | 1 | String | The ID of the Storefront |
| AppCount | 1 | Integer | Number of Application which encounter state transition in this list |
| StatetransAppList | 0 - - - N | Structure | List of application ID(s) to be notified. |

Table 5 shows exemplary structure of the StatetransAppList.

TABLE 5

StatetransAppList structure

| Name | Cardinality | Data Type | Description |
| --- | --- | --- | --- |
| ApplicationID | 1 | String | The ID of the application which encounter state transition |
| State | 1 | Enumeration | The description of the state transition |
| Reason | 0 - - - 1 | String | Reason of the state transition |

Table 6 shows exemplary enumeration of the State.

TABLE 6

State Enumeration

| Enumeration | Description |
| --- | --- |
| online | The state is changed to "online" state |
| invalid | The state is changed to "invalidated" state |

As shown in Table 4, the application state transition notification message 901 may comprise an identity field (StoreID) for indicating an identity of the storefront, an application count filed (AppCount) for indicating a number of application which has encountered the state transition in an application list (StatetransAppList), and the application list field (StatetransAppList). In addition, as shown in Table 5, the application list (StatetransAppList) lists the identity(ies) of application(s) (ApplicationID) to be notified, description(s) of the state transition(s) (State) and reason(s) of the state transition(s) (Reason). According to a preferred embodiment of the invention, as shown in Table 6, the application state transition notification message 901 is transmitted when the current state of the application has transited to the "Online" state (shown as the state transition 601 in FIG. 6) or when the current state of the application has transited to the "Invalidated" state (shown as the state transition 602 in FIG. 6). As illustrated above, in the "Online" state, the application is able to be downloaded or purchased by a client while in the "Invalidated" state, the application is invalidated. Therefore, in the preferred embodiment of the invention, description of the state transition (State) may be designed as an integer to represent whether the current state of the application has transited to the "Online" state or transited to the "Invalidated" state.

Note that in other embodiments of the invention, the application state transition notification message 901 may also be transmitted when any state transition has occurred. For example, the application state transition notification message 901 may be transmitted whenever there is a state transition from one of the "Offline" state, the "Online" state and the "Invalidated" state to another. In still other embodiments of the invention, the application state transition notification message 901 may be periodically or proactively transmitted. For example, the period may be set by the developer support or the storefront. For another example, when the developer support would like to know the current state, the storefront may request storefront to transmit the application state transition notification message 901. In still other embodiments of the invention, transmission of the application state transition notification message 901 may be triggered by some predefined events. The events may be predefined by TAS server or TAS services provider based on its policies. In addition, the application state transition response message 902 may comprise a result field for indicating the status code and error information.

Figure 10:
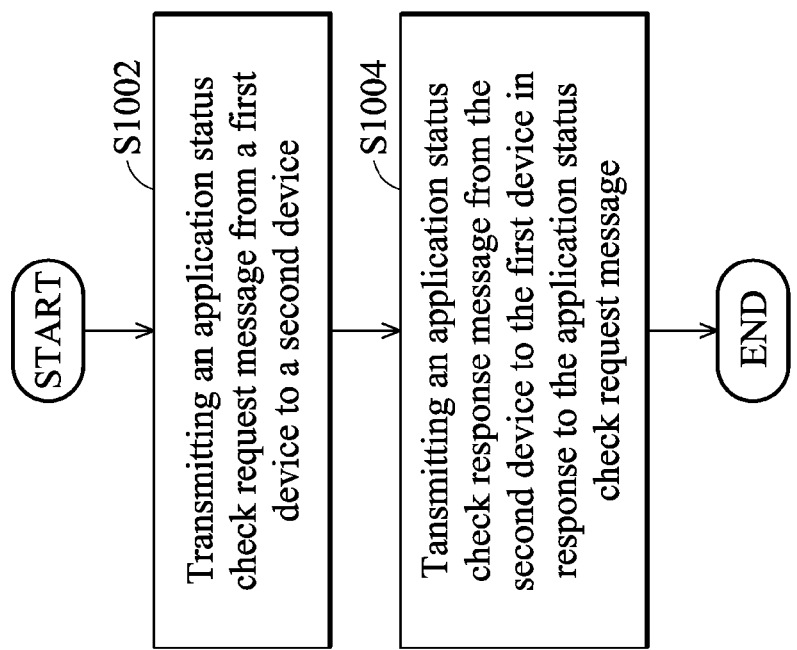
FIG. 10 is a flow chart of a method for notifying a first device of a status of an application according to another embodiment of the invention.

FIG. 10 is a flow chart of a method for notifying a first device of a status of an application according to another embodiment of the invention. To begin, an application status check request message is transmitted from a first device to a second device (Step S1002). Next, an application status check response message is transmitted from the second device to the first device in response to the application status check request message (Step S1004). According to an embodiment of the invention, the application status check response message may comprise information regarding at least a current state of the application.

Figure 11:
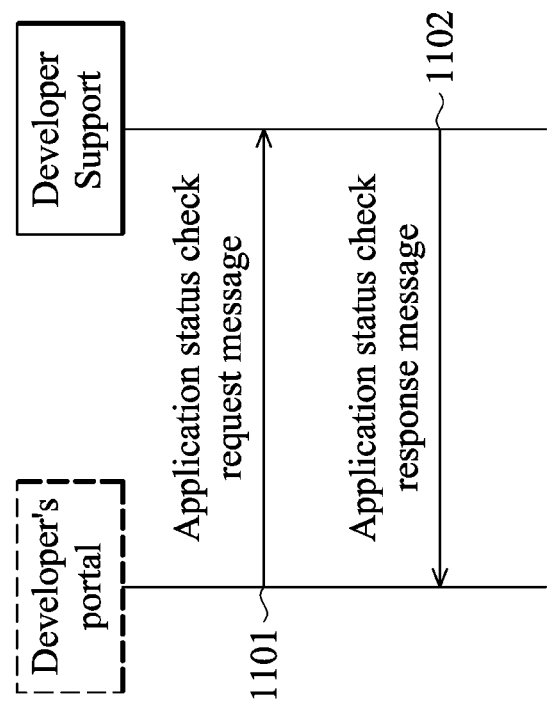
FIG. 11 shows a message flow chart according to a third embodiment of the invention.

According to a third embodiment of the invention, the first device may be a developer's portal component 140 in a Telco's Application Store (TAS) system, the second device may be a developer support component 120 in the TAS system, and the application status check response message may be transmitted via the TAS-5 interface. Note that in the third embodiment, the status of the application is maintained (such as the state flow control diagram shown in FIG. 5) by the developer support component 120. FIG. 11 shows a message flow chart according to a third embodiment of the invention. As shown in FIG. 11, the developer's portal may transmit an application status check request message 1101 to the developer support. In response to the reception of the application status check request message 1101, the developer support may further transmit an application status check response message 1102 to the developer's portal.

Table 7 shows exemplary content of the application status check request message 1101.

TABLE 7

Application Status Check Request message

| Name | Cardi-nality | Data Type | Description |
|---|---|---|---|
| Developer-ID | 1 | String | The ID of the TAS Developer. |
| AppID | 1 | String | Application ID to be checked |

Table 8 shows exemplary content of the application status check response message 1102.

TABLE 8

Application Deletion Response message

| Name | Cardi-nality | Data Type | Description |
|---|---|---|---|
| AppStatus | 1 | Enumera-tion | The application audit status |
| Reason | 0 . . . 1 | String | Reason for the application not being able to be on online |

Table 9 shows exemplary enumeration of the AppStatus.

TABLE 9

AppStatus Enumeration

| Enumeration | Description |
|---|---|
| 0 | Submitted |
| 1 | Audited |
| 2 | Tested |
| 3 | Online |

As shown in Table 7, the application status check request message may comprise a first identity field (Developer-ID) for indicating an identity of the TAS developer and a second identity field (AppID) for indicating an identity of the application to be checked. As shown in Table 8, the application status check response message may comprise a status field (AppStatus) for indicating the current state of the application and a reason field (Reason) for indicating reason for the application not being able to transit to the "Online" state. As shown in Table 9, in a preferred embodiment of the invention, the current state carried in the status field may be selected from a group comprising the "Submitted" state, the "Audited" state, the "Tested" state and the "Online" state.

Note that in other embodiments of the invention, the application status check response message 1102 may also be actively transmitted when any state transition has occurred (that is, without receiving the application status check request message 1101). For example, the application status check response message 1102 may be transmitted whenever there is a state transition from one of the "Submitted" state, the "Audited" state, the "Tested" state, the "Online" state, the "Offline" state and the "End" state to another. In still other embodiments of the invention, the application status check response message 1102 may be periodically or proactively transmitted. For example, the period may be set by the developer support or the developer. In still other embodiments of the invention, transmission of the application status check response message 1102 may be triggered by some predefined events. The events may be predefined by TAS server or TAS services provider based on its policies. For example, the events may be related to charging, network resource, and so on. To be more specific, as an example, when the developer is running out of its quota for resource, the application status check response message 1102 may be transmitted to notify the developer of the reason of for the application not being able to be online.

In addition, the application state transition notification message, the application state transition response message, the application status check request message and/or the application status check response message may be represented in a form other than a message. For example, the representation there of may be a short message service (SMS), an e-mail, a multi-media message service (MMS), the WAP push, the public or private message on any social network (such as facebook, MSN . . . etc.), or others.

The application status notification methods as previously described, or certain aspects or portions thereof, may take the form of a program code (i.e., executable instructions) embodied in tangible storage media, such as floppy diskettes, CD-ROMS, hard drives, or any other machine-readable storage medium, wherein, when the program code is loaded into and executed by a machine, such as a computer or a processor, the machine thereby becomes an apparatus or device for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer or a processor, the machine becomes an apparatus or device for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for notifying a first device of a status of an application, comprising:
   transmitting an application state transition notification message from a second device to the first device when a state transition of the application has occurred, wherein the application state transition notification message comprises information regarding at least a current state of the application and a reason of the state transition;
   transmitting an application state transition response message from the first device to the second device in response to the application state transition notification message,
   wherein the first device is a storefront component in a Telco's Application Store (TAS) system, the second device is a developer support component in the TAS system, and the application state transition notification message is transmitted via a TAS-1 interface, and wherein the status of the application is maintained by the developer support component, and
   wherein the application state transition notification message is transmitted when the current state of the application has transited from an online state to an offline state, and wherein in the online state, the application is able to be downloaded or purchased by a client, and while in the offline state, the application is unable to be downloaded or purchased by a client.

2. The method as claimed in claim 1, wherein the application state transition notification message further comprises information regarding a previous state of the application.

3. The method as claimed in claim 1, wherein the first device is a developer support component in a Telco's Application Store (TAS) system, the second device is a storefront component in the TAS system, and the application state transition notification message is transmitted via a TAS-6 interface, and wherein the status of the application is maintained by the storefront component.

4. The method as claimed in claim 1, wherein the application state transition notification message is transmitted when the current state of the application has transited from an online state to an end state, and wherein in the online state, the application is able to be downloaded or purchased by a client while in the end state, application is deleted or revoked.

5. The method as claimed in claim 3, wherein the application state transition notification message is transmitted when the current state of the application has transited to an online state, and wherein in the online state, the application is able to be downloaded or purchased by a client.

6. The method as claimed in claim 3, wherein the application state transition notification message is transmitted when the current state of the application has transited to an invalidated state, and wherein in the invalidated state, the application is invalidated.

7. The method as claimed in claim 1, wherein the application state transition notification message comprises an identity field for indicating an identity of the second device, an application count filed for indicating a number of application which has encountered the state transition in an application list, and the application list field for listing identity(ies) of application(s) to be notified, description(s) of the state transition(s) and reason(s) of the state transition(s).

8. The method as claimed in claim 7, wherein the description of state transition is an integer to represent whether the current state of the application has transited from an online state to an offline state or from an online state to an end state, or an integer to represent whether the current state of the application has transited to an online state or an invalidated state.

9. A method for notifying a first device of a status of an application, comprising:

transmitting an application status check request message from the first device to a second device;

transmitting an application status check response message from the second device to the first device in response to the application status check request message, wherein the application status check response message comprises information regarding at least a current state of the application, wherein the first device is a developer's portal component in a Telco's Application Store (TAS) system, the second device is a developer support component in the TAS system, and the application status check request message is transmitted via a TAS-5 interface, and wherein the status of the application is maintained by the developer support component, wherein the application status check response message comprises a status field for indicating the current state of the application and a reason field for indicating reason for the application not being able to transit to an online state, and wherein the current state carried in the status field is selected from a group comprising a submitted state, an audited state, a tested state and the online state.

10. The method as claimed in claim 9, wherein the application status check request message comprises a first identity field for indicating an identity of the first device and a second identity field for indicating an identity of the application to be checked.

* * * * *